United States Patent [19]

Saito et al.

[11] Patent Number: 4,764,777

[45] Date of Patent: Aug. 16, 1988

[54] THERMAL-ELECTROSTATIC INK JET RECORDING APPARATUS

[75] Inventors: Koichi Saito; Yoshihiko Fujimura; Nanao Inoue, all of Kanagawa, Japan

[73] Assignee: Fuji Xerox Co., Ltd., Tokyo, Japan

[21] Appl. No.: 30,161

[22] Filed: Mar. 26, 1987

[30] Foreign Application Priority Data

Mar. 27, 1986 [JP] Japan .................................. 61-67307

[51] Int. Cl.[4] ............................................. G01D 15/16

[52] U.S. Cl. ................................ 346/140 R; 400/126; 346/75

[58] Field of Search ............ 400/126; 346/1.1, 140 R, 346/140 PD, 75, 153.1, 155, 159

[56] References Cited

FOREIGN PATENT DOCUMENTS 0196820 10/1986 European Pat. Off. ............ 400/126
0090775 5/1985 Japan ............................ 346/140 PD
0206654 10/1985 Japan ............................ 346/140 PD
0245557 12/1985 Japan ............................ 346/140 PD
1484368 9/1977 United Kingdom ......... 346/140 PD

*Primary Examiner*—E. A. Goldberg
*Assistant Examiner*—Huan H. Tran
*Attorney, Agent, or Firm*—Finnegan, Henderson, Farabow, Garrett and Dunner

[57] ABSTRACT

A non-impact ink jet image recording head for jetting a liquid coloring agent, such as ink, at a recording member (paper) wherein both electric and thermal energies are applied to ink contained in the image recording head; wherein heating elements are provided in a horizontal base and the ink is contained above the heating elements. Preferably, a pair of damlike members, with a discharge portion, contain the ink in a channel above the heating elements.

8 Claims, 6 Drawing Sheets

THERMAL-ELECTROSTATIC INK JET RECORDING APPARATUS

FIELD OF THE INVENTION

This invention relates to a non-impact image recording head for recording an image by jetting a liquid coloring agent, such as ink, at a recording member.

BACKGROUND OF THE INVENTION

The non-impact, or ink jet recording method is becoming popular as a method for converting image data in the form of electrical signals into hard copies because less noise is produced during recording than by the impact method. The ink jet method is also considered particularly useful because ordinary paper can be used without the need for a special process, such as fixing, for recording purposes.

One ink jet method that has already been used comprises the steps of filling an airtight container with ink, applying a pressure pulse thereto, and sending the ink out of the orifice of the container in a jet for recording purposes. The ink jet recorder for this method cannot be made compact because of its operating mechanism, and the recorder requires mechanical scanning in order to record with a desired image density. This has caused the recording speed to be reduced.

Other techniques have been proposed for remedying shortcomings inherent in the ink jet method and making high-speed recording possible. The magnetic ink jet method is a typical example of an alternative method and comprises arranging magnetic ink close to a magnetic electrode array, forming an ink-jet state corresponding in position to a picture element by making use of a swell of the ink in the presence of a magnetic field, and jetting the magnetic ink in the static electric field. Since this method admits of electronic scanning, high-speed recording becomes possible, but it is still disadvantageous in that selection of ink is limited and the coloration characteristic of magnetic ink is often unsatisfactory.

Additionally, there is also known a so-called plane ink jet method, which comprises arranging ink in a slit-like inkholder in parallel to an electrode array, and jetting the ink in accordance with an electric field pattern formed between an electrode facing the electrode array through recording paper. Since no minute orifice for jetting ink is required in this method, the problem of ink clogging is minimized. However, high voltage applied for jetting the ink makes it necessary to drive the electrode array on a time division basis to prevent a voltage leak across adjoining or neighboring electrodes with the disadvantage that the recording speed is limited.

There has also been proposed the so-called heat bubble jet method for jetting ink out of an orifice by means of thermal energy. In this method, ink bubbles are formed when the ink is abruptly heated to cause film boiling. A pressure rise resulting from the rapid formation of bubbles within the orifice is utilized to jet the ink. However, the film boiling temperatures are as high as 500°-600° C. and this makes it difficult to put this method to practical use because ink properties tend to vary with changes in temperature and because a protective layer provided over a heating resistor is deteriorated at elevated temperatures.

As set forth above, many problems remain to be solved in ink jet methods heretofore developed. The problems include difficulty in sufficiently increasing recording speed, the necessity of employing special ink and contriving a particular driving means, and thermal deterioration of the ink and the other elements of a recorder.

OBJECT AND SUMMARY OF THE INVENTION

The present invention is intended to solve the above problems and it is therefore an object of the invention to provide an image recording head for recording images at high speed without difficultly in selecting ink for use.

According to the present invention, there is provided an image recording head wherein both electric and thermal energies are applied to a liquid coloring agent to jet the liquid coloring agent located in the area to which both the energies have been applied, which comprises thermal energy applying means for heating the liquid coloring agent and electric energy applying means for applying an electric field to the liquid coloring agent. The thermal energy applying means further comprises heating means provided on a horizontal base and the liquid coloring agent containing means is positioned above the thermal energy applying means. The heating means preferably comprises heating resistors installed on the base, and the liquid coloring agent containing means preferably comprises a pair of damlike members with a liquid coloring agent discharge portion in the form of a channel disposed above the heating resistors.

At least one of the damlike members of the liquid coloring agent containing means is a liquid coloring agent supply member allowing the liquid coloring agent to pass therethrough.

A plurality of heating elements, for instance, are arranged within the image recording head in the form of an array and allowed to contact the liquid coloring agent. In response to an image signal, a heating element located in a position corresponding to a recording picture element is selectively heated and a uniform electric field is applied to the whole liquid coloring agent. Thus, the liquid coloring agent is caused to be jetted at a recording member. One picture element is recorded for each jetting of the agent. By the repetition of the aforesaid process, a picture element train may be recorded in the form of a line and, by scanning the recording member, a complete image can be recorded. Recording can be made likewise with a plurality of electric field forming elements for locally applying an electric field while the liquid coloring agent is uniformly heated to a predetermined temperature.

According to the present invention, the base is arranged horizontally and, e.g., a pair of damlike members are provided thereon to hold the liquid coloring agent introduced therebetween. The liquid coloring agent is heated by the spaced apart heating elements arranged, e.g., in an array on the base. The liquid coloring agent can thereby be held simply and stably. A liquid coloring agent supply member is employed to supply the liquid coloring agent continuously to the image recording head and it is jetted from the discharge portion.

The method of operating the image recording head according to the present invention comprises applying the electric and thermal energies to the liquid coloring agent and jetting the agent located in the area to which both the energies have been applied. An electric field may be uniformly applied to the whole liquid coloring agent first but at a level so that the agent is not sufficiently stimulated to be jetted. Then, thermal energy is selectively, locally applied to the agent, whereby the agent located in the area receiving the thermal energy is caused to be jetted out of the image recording head toward a recording member. If the liquid coloring agent is heated to the extent that it is not sufficiently stimulated to be jetted in the absence of an electric field, the same phenomenon occurs when the electric field is locally applied.

BRIEF DESCRIPTION OF THE DRAWINGS

The present invention will be fully understood when the following detailed described is considered with reference to the accompanying drawings wherein.

DETAILED DESCRIPTION OF THE INVENTION

Figure 2A:
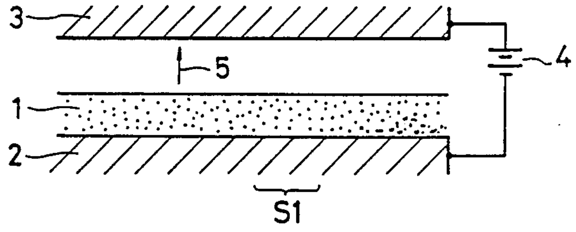
FIG. 2(A)-2(C) are schematic views illustrating the recording principle of the present invention.
Figure 2B:
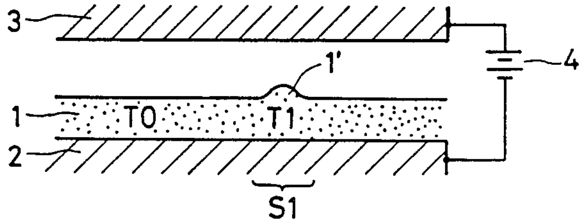
Figure 2C:
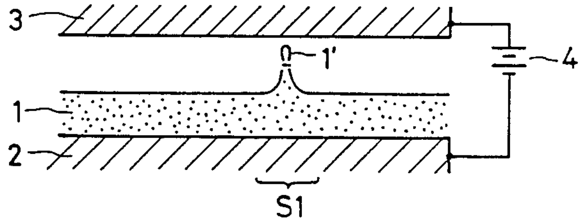

Referring now to FIGS. 2(A)-2(C), the recording principle of the image recording head according to the present invention will be described. As shown in FIG. 2(A), a liquid coloring agent 1 is arranged between a base electrode 2 and an opposite electrode 3. Preferably, the liquid coloring agent 1 is ink (hereinafter referred to as simply the "ink 1") which has appropriate electric resistance and is in a liquid state when the recording head is operated. The base electrode 2 and the opposite electrode 3 are both electrically conductive plates.

A d.c. power supply 4 is used to apply voltage across the electrodes 2, 3. At this time, a fixed static electric field is added to the ink 1 and, because of its static inductive action, the Coulomb force given by the sum of the inductive charge produced thereby and the static electric field acts on the free surface of the ink. Therefore, the ink 1 is used to jet in a direction 5 due to that force.

On the other hand, the combined effects of surface tension, interfacial tension, and viscosity resistance of the ink act on the ink as drag and deter jetting. FIG. 2(A) shows the state in which the effect of drag is greater than the Coulomb force and the surface of the ink remains flat.

The ink 1 is then locally heated; that is, the temperature of an area S1 in FIG. 2(B) is raised to T1 which is higher than the temperature, T0, of the rest of the ink. As shown in FIG. 2(B), consequently, the ink level in the area S1 is caused to swell because the increased temperature of ink in the area S1 reduces drag and enables the action of the Coulomb force to increase locally. The electric field is concentrated in the ink 1 thus swollen, and the action of the Coulomb force is further accelerated. Ultimately, part of the ink 1' in the area S1 forms a column as shown in FIG. 2(C) and a droplet will be jetted therefrom to the opposite electrode 3. This phenomenon can be brought about rapidly without sharply heating the ink as the surface thereof undergoes a phase change resulting from film boiling.

In other words, thermal and electric energies are applied to the ink at levels to cause jetting of the ink only in an area to which both the energies have been applied. The place at which the ink is caused to jet and timing of the jetting are thereby controllable.

The aforesaid principle was demonstrated through the following experiments. The ink 1 was arranged on the base electrode 2 as shown in FIG. 2(A) and, while the temperature thereof was kept constant, the voltage of the power supply 4 was gradually raised. When the voltage exceeded a certain level, an ink column 1' shown in FIG. 2(C) began to grow randomly toward the opposite electrode 3. This phenomenon is described as the growth of an unstable electrical field mechanical wave in "FIELD-COUPLED SURFACE WAVES;" pp. 61-66, J. R. Melcher (M.I.T. Press).

In other words, the Coulomb force is locally concentrated by the perturbation (local unevenness in the deformation of the liquid level or electric field) naturally produced when the Coulomb force acting in the upward direction perpendicular to the ink liquid level maintains equilibrium against the drag acting in the downward direction. Then the Coulomb force overcomes the drag to allow the ink column to grow.

In the present invention, the level of the electric field was selected to be insufficient to cause ink columns to grow randomly in the absence of the application of thermal energy to the ink. When the ink was heated in the pressure of an electric field of that level, the surface tension and viscosity of the ink located in the heated area was reduced. As a result, an unstable surface wave was produced in the presence of an that electric field having a level that was by itself insufficient to cause the ink column to grow. Ink was jetted as a droplet to the surface of a recording member, such as recording paper, so that one dot could be recorded. Moreover, an image could be recorded by arranging the dots methodically.

Figure 1:
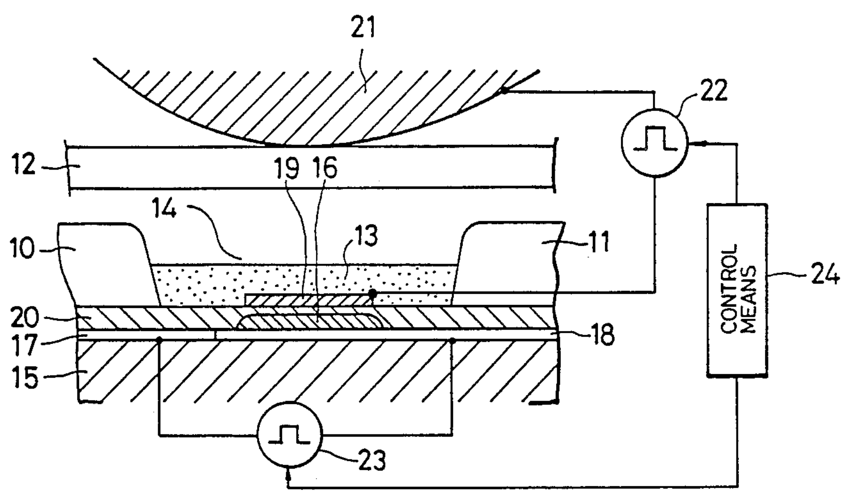
FIG. 1 a vertical sectional view of an image recording head embodying the present invention.
Figure 3:
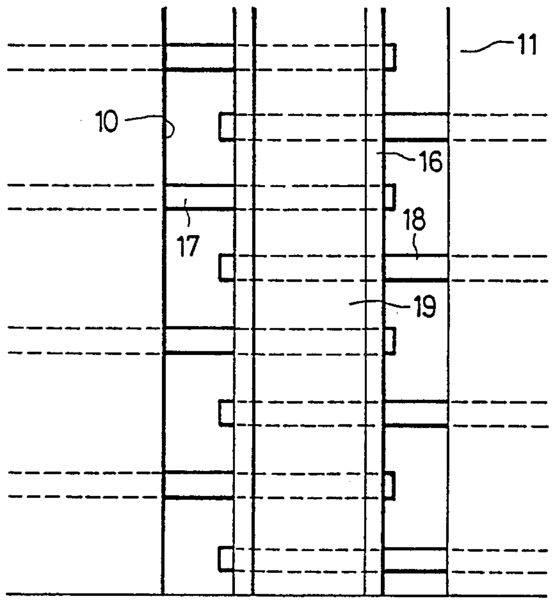
FIG. 3 is a top view of the principal portion of FIG. 1.

Referring to FIGS. 1 and 3, alternating lead electrodes 17, 18 were formed on a horizontally arranged base 15 and belt-like heating resistors 16 were formed perpendicularly across the lead electrodes 17, 18, and was connected to corresponding lead electrodes 17, 18. A heat resistant insulating layer 20 was used to cover the surface of the aforesaid combination. The recording head thus constructed is quite similar to a thermal head for use in a conventional heat transfer type printer having for example, a picture element recording pitch of 8 dots/mm.

Moreover, an electric field forming electrode 19 composed of gold approximately 1,000 Å thick and 150 μm wide was formed on the heat resistant insulating layer by mask evaporation. Further, dam-like polyurethane resin members 10, 11 were provided on both sides of the electric field forming electrode 19. A groove approximately 150 μm wide and 200 μm deep was formed with the electric field forming electrode 19 at its center. The liquid coloring agent 13 was contained therebetween and a liquid coloring agent discharge portion 14 was formed in the center.

Ordinary recording paper, as used in a conventional copying machine, was arranged as a recording member 12 and was supported by a backing or opposite electrode 21. A power supply 22 was connected between the opposite electrode 21 and the electric field forming electrode 19 to form an electric energy applying means.

The electrodes 17, 18 on both sides of the heating resistors 16 were connected to a power supply 23 to form a thermal energy applying means. The liquid coloring agent discharge portion 14 was arranged to contain ink 13 up to a depth of about 100 μm.

A dye soluble oil ink was used which had the following properties: volume resistivity=$10^7$ Ωcm; viscosity=30 cp; and surface tension=37 dyne/cm. As the opposite electrode 21, moreover, a metal roll 4 mm in diameter was used, whereas the gap between the electric field forming electrode 19 and the opposite electrode was set at 300 μm.

The heating resistors 16 were operated on a time division basis as in the case of a conventional thermal head. In this embodiment, they were driven on a sexpartite basis and energized with 17 V for 2 msec per dot. Voltage at 2,000 V was applied, synchronously with the energization, across the opposite electrode 21 and the electric field forming electrode 19 at the same timing. Power supplies 22, 23 selectively produced electric pulses in response to the image signal corresponding to an image being recorded and were controlled by a control means 24. The control means 24 consisted of a shift register driver such as the type used for driving a known thermal printing head. Only the ink in the heated area jetted from the discharge portion 14 at the recording member 12, whereby a circular dot about 80 μm in diameter was recorded on the recording surface.

In the case of the aforesaid embodiment, the electric field forming electrode 19 was positioned immediately above the heating resistor 16 and was arranged so as not to face the left and right lead electrodes 17, 18. The reason for this was to prevent the current for driving the heating resistor 16 from increasing because of capacitive coupling between the electric field forming electrode 19 and the lead electrodes 17, 18.

When the above operation was conducted while no voltage was applied across the electric field forming electrode 19 and the opposite electrode 21, the ink was not caused to be jetted.

When the voltage being applied across the electric-field forming electrode 19 and the opposite electrode 21 was raised without supplying the current to the heating resistor 16, the ink 13 was seen to jet randomly throughout the discharge opening 14 at a voltage level exceeding 3,000 V.

As explained above, the ink is caused to jet by applying the electric and thermal energies to the liquid coloring agent. There exist threshold conditions or values under which it is allowed to jet and a marginal value (threshold value) at which control can be effected to ensure stable ink flying.

Figure 4A:
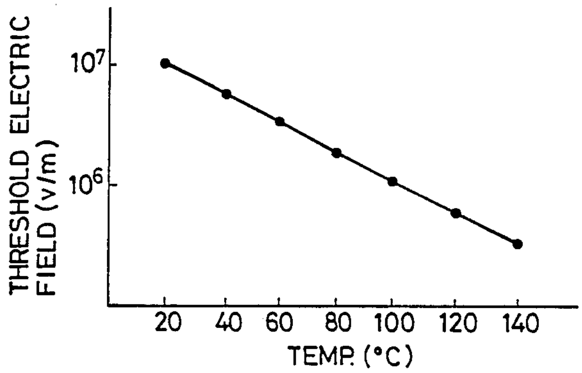
FIGS. 4(A)-4(D) are graphs showing the dependence of the threshold value of an electric field on temperatures and ink properties.
Figure 4B:
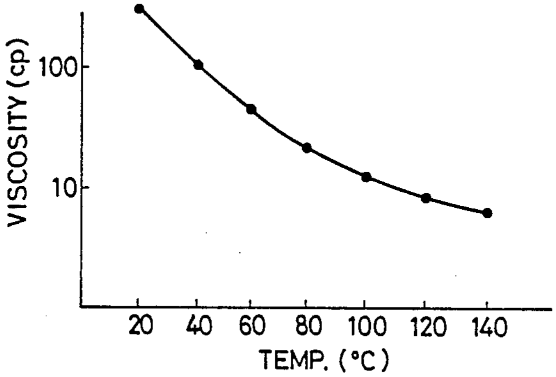
Figure 4C:
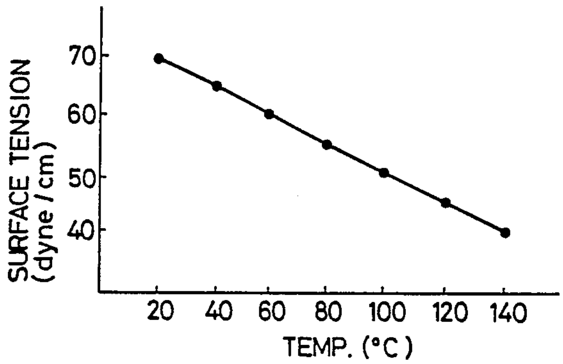
Figure 4D:
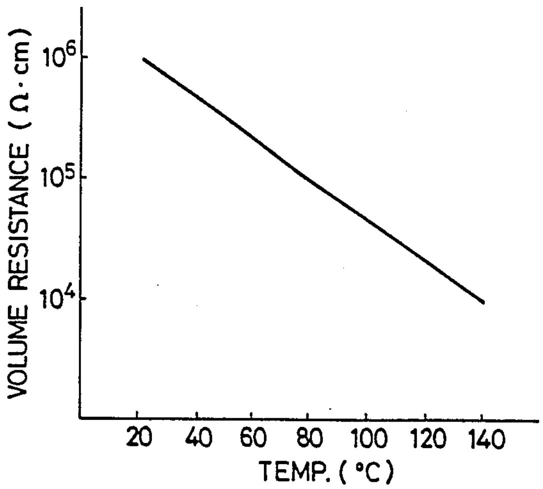

FIGS. 4(A)–4(D) are a graphs showing the results of experiments intended to define the threshold values. According to the data shown in FIG. 4(A), the higher the ink temperature, the lower the threshold electric field value becomes. As shown in FIG. 4(B), the viscosity of the ink decreases as the ink temperature rises. The same relationship is observed in the cases of the surface tension (FIG. 4(C)) and specific volume resistance (FIG. 4(D)).

In other words, the threshold electric field value decreases as the temperature rises, depending on the composite effect resulting from changes in physical properties including the viscosity, surface tension, and electrical conductivity of the ink.

Accordingly, while an electric field at which the ink is not yet stimulated to be jetted is given at room temperature, the ink is caused to jet from locations where it is heated because of the cooperative action of the heat and static electric field, so that picture element recording is carried out.

Figure 5:
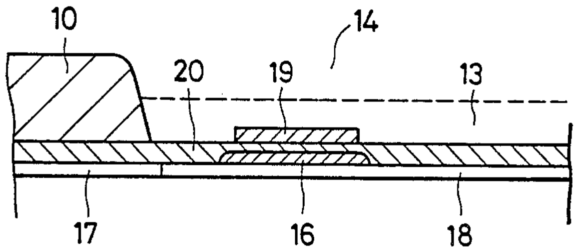
FIGS. 5 through 10 are vertical sectional views of additional embodiments of recording heads according to the present invention.

FIG. 5 shows a modified embodiment of the image recording apparatus according to the present invention. In this embodiment, the damlike member 10 of polyurethane resin 250 μm high was formed 200 μm away from a first end of the electric field forming electrode 19. No damlike member is formed on the other end of the electric field forming electrode 19. According to this embodiment, the continuous supply of ink is more readily made than in the embodiment illustrated in FIG. 1.

Figure 6:
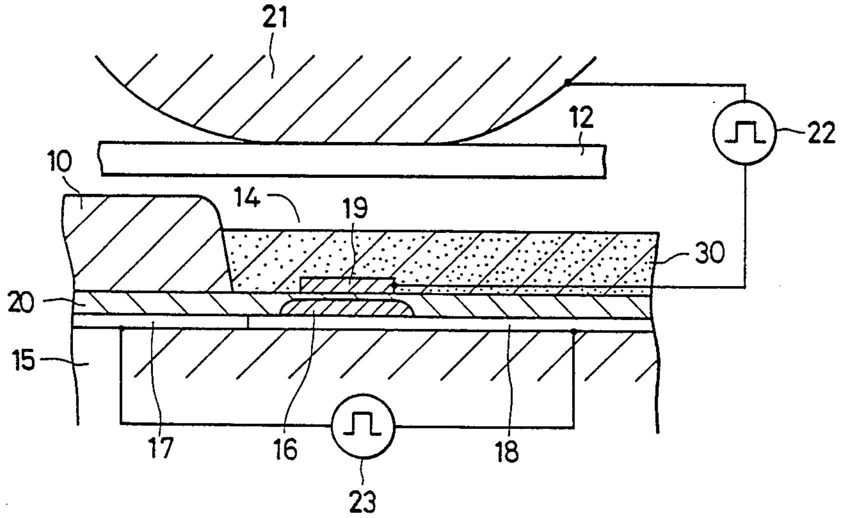

According to another embodiment an ink absorption layer 30 may be provided as shown in FIG. 6. The ink absorption layer 30 may be unwoven fabric (HC-5408 250 μm thick) prepared from aromatic polyamide fiber. In this embodiment, use may be made of dye soluble oil ink having the following properties at 20° C.: volume resistivity=about $10^7$ Ωcm; viscosity=30 cp; and surface tension-37 dyne/cm. The unwoven fabric 30 may be dipped in the ink first with one end of the fabric being immersed in an ink tank (not shown). The opposite electrode 21 may comprise a metal roll 4 mm in diameter.

In an experiment utilizing the embodiment of FIG. 6, the heating resistor 16 was energized with 20 V for 2 msec per dot and voltage was applied in synchronism with the energization across the opposite electrode 21 and the electric field forming electrode 19. The ink 13 was jetted from discharge portion 14 and an 80 μm dot was recorded on the recording member 12. Operation was smoothly conducted until the ink in the tank had been consumed completely.

In the case of this embodiment, the ink was supplied to the discharge portion because of capillary action and also was attracted thereto because of the electrostatic induction of the electric field applied to the discharge portion.

Figure 7:
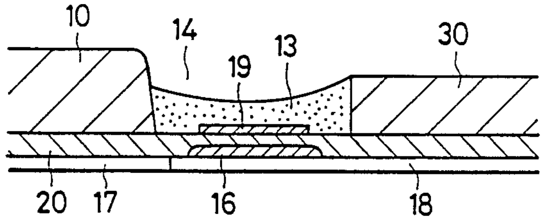

FIG. 7 shows an example wherein the unwoven fabric 30 of FIG. 6 is provided only on one side of the electric field forming electrode 19, and a channel for containing the ink 13 is formed above the electric field forming electrode 19.

Figure 8:
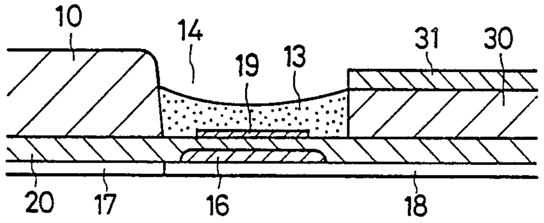

FIG. 8 shows another example wherein a film 31, not permeable to the ink, is stuck to the surface of the unwoven fabric 30 and, in that case, pressure may be applied to the film 31 from the upward or right side to continuously supply the ink.

Figure 9:
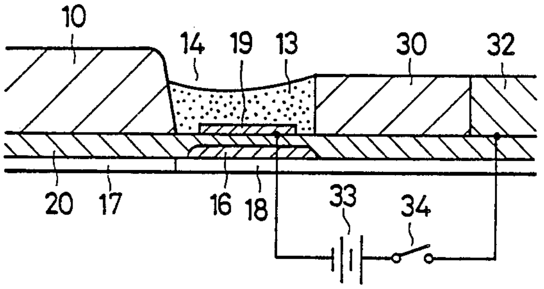

In the case of FIG. 9, the ink 13 is supplied by means of electrostatic induction with reference to the embodiment of FIG. 7. A copper coated ink absorption material 32 that has been made conductive is provided on the side of the unwoven fabric 30. A power supply 33 supplies direct current between the electric field forming electrode 19 and the ink absorption material 32.

When the recording voltage is not applied to the electric field forming electrode 19, the switch 34 of the d.c. power supply 33 is turned on for a predeterminus time, thereby a fixed quantity of ink 13 is successively supplied to the discharge portion 14. Voltage at 300 V is preferably supplied for 20 msec from the d.c. power supply 33 approximately once for every 300 jettings of ink droplets.

Figure 10:
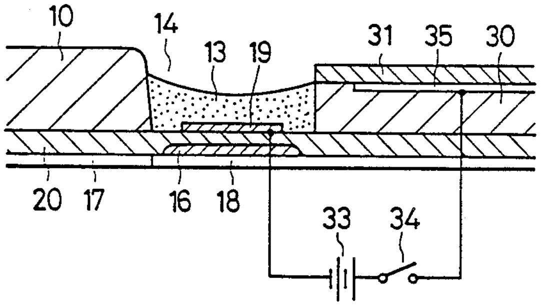

In an embodiment shown in FIG. 10, a film 31, not permeable to the ink 13, is adhered to the surface of the unwoven fabric 30 as shown in FIG. 8. The action thereof is the same as that of FIG. 8. In this instance, an electrode 35 for supplying the ink is formed on the back of the film 31 and a power supply 33 is directly connected between the electrode 35 and the electric field forming electrode 19.

The present invention is not limited to the embodiments described above, and variations thereof may be made without departing from the scope of this invention which is limited only by the following claims. Although beltlike heating resistors have been used and partially heated by way of example, independent heating resistors each having lead electrodes at both ends may be arranged in array for use. The image recording head according to the present invention is capable of jetting the ink for high-speed and high-sensity recording at temperatures not exceeding what causes the extreme thermal deterioration of the ink, the heating resistors and the like with an electric field not so intense as to cause leakage across the electrodes. Moreover, the means for holding the ink is relatively simple in construction and needs no complicated precise mechanism. Futhermore, the comparatively small quantity of the electric and thermal energies is sufficient, so that the driving circuit is made compact thereby.

What is claimed is:

1. An image recording apparatus adapted to apply both electric and thermal energies to a liquid coloring agent to jet droplets of a liquid coloring agent toward a backing electrode adapted to support a recording medium comprising:

means for containing the liquid coloring agent, said containing means including a base member;

electric energy applying means including an electric field forming electrode arranged in said containing means;

a first power supply means for establishing a voltage drop between the electric field forming electrode and the backing electrode to produce the electric field having a level less than the level required to jet liquid coloring agent toward the backing electrode;

thermal energy applying means including a plurality of heating elements arranged on said base member and lead electrodes adapted to supply current to said heating elements;

a heat resistant insulating layer over said heating elements and said electric field forming electrode being positioned on said insulating layer; and second power supply means for selectively energizing said heating elements to raise the temperature of the liquid coloring agent in the area of said energizing heating elements to jet droplets of said liquid coloring agent under the influence of said electric field;

wherein said containing means includes at least one dam-like member on said base member for containing the liquid coloring agent above said electric field forming electrode and said heating elements.

2. An image recording apparatus according to claim 1, wherein said containing means further comprises two spaced apart dam-like members on said base member defining a channel intermediate said dam-like members for containing said liquid coloring agent.

3. An image recording apparatus according to claim 1, wherein said containing means further comprises an absorbent member above said electric field forming electrode, said absorbent member being adapted to be in fluid communication with an ink supply such that ink flows by capillary action and by an inductive force generated by said electric energy applying means.

4. An image recording apparatus according to claim 3, wherein said liquid coloring agent comprises ink and said containing means comprises an absorbent member and a dam-like member, and a channel for containing the ink is located between said wall member and said absorbent member, said absorbent member being adapted to supply ink from an ink supply to said channel by capillary action.

5. An image recording apparatus according to claim 4, wherein said absorbent member is adapted to contain ink and further includes a film on said absorbent member, said film being adapted to uniformly distribute pressure over said absorbent member such that ink contained in said absorbent member is continuously supplied from said absorbent member to said channel.

6. An image recording apparatus according to claim 4 further comprising:

an electrostatic induction ink supply comprising conductive ink absorption material containing ink; and power supply means for applying current to said electrostatic induction ink supply to cause said ink supply to supply ink to said absorbent member.

7. An image recording apparatus according to claim 3, 4, 5, or 6 wherein said absorbent material comprises unwoven fabric formed of aromatic polyamide fibers.

8. An image recording apparatus according to claim 1 wherein there are a plurality of said dam-like members arranged on said base member to form a plurality of said channels.

* * * * *